United States Patent [19]
Johnson

[11] Patent Number: 6,102,667
[45] Date of Patent: Aug. 15, 2000

[54] ANALOG CONTROL OF TANKLESS AUTOMOBILE TIRE INFLATER SYSTEMS

[76] Inventor: Oriz W. Johnson, 7086 Butterwood Dr., Cincinnati, Ohio 45241-1035

[21] Appl. No.: 09/131,714

[22] Filed: Aug. 10, 1998

[51] Int. Cl.[7] .............................. F04B 19/24; F04B 49/00
[52] U.S. Cl. .............................. 417/53; 417/12; 417/94.2
[58] Field of Search .............................. 417/53, 12, 44.1, 417/44.2; 73/146.2, 146.5, 146.3; 141/38

[56] References Cited

U.S. PATENT DOCUMENTS

| | | | |
|---|---|---|---|
| 4,289,225 | 9/1981 | Scholta | 194/9 |
| 4,733,540 | 3/1988 | Sakurai | 62/133 |
| 5,512,883 | 4/1996 | Lane, Jr. | 340/648 |
| 5,767,398 | 6/1998 | Naedler | 73/146.2 |

*Primary Examiner*—Henry C. Yuen
*Assistant Examiner*—Mahmoud M Gimie

[57] ABSTRACT

An energy efficient electric control circuit for tankless automobile tire inflater machines wherein, in combination with an air pressure vent port, a current-draw tire inflation analog is created, said control circuit having current sensing means for tracking said inflation analog with such precision that virtually no extraneous compressor operation is experienced. The compressor operation is terminated promptly after tire inflation activity is completed rather than after a more prolonged fixed-time period.

9 Claims, 2 Drawing Sheets

ANALOG CONTROL OF TANKLESS AUTOMOBILE TIRE INFLATER SYSTEMS

BACKGROUND

CROSS REFERENCE TO RELATED APPLICATION

This invention uses the inventor's patent, U.S. Pat. No. 5,780,734 dated Jul. 14, 1998.

BACKGROUND

Field of Invention

This invention relates to electrical machinery control circuits, specifically those for controlling compressor operations in automobile tire inflation machines.

BACKROUND—DISCUSSION OF THE PRIOR ART

HISTORY:

Since the energy crisis in 1973, gas stations and convenient stores have provided tire inflation service largely on a self-service basis using small dedicated "air machines" for this purpose in lieu of the traditional pressurized tank with a pressure-stat controlled compressor. The air machines each has its own small compressor controlled not by a pressure-stat but by a timer set for a fixed time.

HOW MANY AND WHO:

There are estimated to be in the order of 125,000 air machines, some owned by the owners of the locations at which the machines are used, to wit, gas stations and convenience stores, but most are coin-operated and owned by entrepreneur dealers who provide them to willing locations in return for a share of the earnings. The entrepreneurs do the maintenance on their machines but do not pay the electric bills. Ownership and electric bills make a difference, to be illustrated later.

CYCLE TIME:

The time interval for most air machines is generously set at 3.5 minutes, a few shorter, a few longer, for the slowest users, or to allow time to top off all four tires, which is rarely actually done. In point of fact, and the prime focus of this application, is that the 3.5 minute cycle not withstanding, most actual usage is for a single low tire requiring about a minute and a half for the driver to bring up to pressure, throw the gauge down in the mud, and hit the road again. The compressor for 2 minutes in this case, is left pounding away—while the user drives away.

HIGHT PRESSURE TRAUMA:

The compressor is always working under load, when it is not actually inflating a tire, it is working against a closed system, to wit, building up pressure in the hose having at its end a gauge shut-off valve. For safety, the system compressor is equipped with a pressure relief valve generally set at 100 pounds, which the hose pressure always exceeds when it is not actually inflating.

It is well known in the trade that, on average, more than half of the 3.5 minute fixed-timed cycle the air machine compressors are needlessly pumping air up to 100 pounds, requiring considerable power to do so and placing needless high pressure wear and stress on compressor components, namely broken piston rods, which are legion in the marginal, cheaply constructed compressors used in air machines, and secondly, worn piston rings which are made of cheap Teflon membrane.

NO LESSON FROM HISTORY:

The cost of both the compressor repairs and the needless energy is substantial. Even so, no apparent thought has ever been devoted to how to eliminate this needless trauma time. That is, without shortchanging those users that actually do need the full time to address their tires. The reason, of course, is that no one knows how to do it! Happily, the inventor's just patented pressure release port accessory for air machine inflater gauges, when coupled with an improved conventional electrical compressor control circuit provides an excellent answer.

OBJECTIVES AND ADVANTAGES

The objective of the invention is to further reduce compressor damage over that achieved by the recently patented vent port for the advantage of the machine owners, and to reduce power consumption of the machines for the benefit of the location owners who pay the power bills.

The compressor damage reduced by the vent port is very significant. By eliminating all operating pressures greater than 35 psi, compressor rod breakage which is directly proportional to higher psi is literally nipped in the bud. However, the compressor does continue to operate, albeit at lower pressures. This low pressure operation still results in continuing piston ring friction wear and unnecessary power consumption. Thus the continuing search for salvation.

The best technique for saving power is to shut off the machine as soon as possible after the inflation activity is completed. Intuitively one has to agree that eliminating compressor run time not only reduces energy but also reduces compressor wear. The trick is how to do it.

As will be revealed, a technique has indeed been devised that eliminates virtually all needless compressor operation, while at the same time insuring slow or extensive machine users as much of the 3.5 minute fixed time operation as they actually need. Happily this is done with no moving parts. The piston that opens and closes the patented vent port is actually only a modification of an extraneous part of the existing gauge valve piston, so it is not actually an added part. Moreover the piston action is directly driven by hand so piston wear yes, failure no. The new components added to the existing electric control circuit are solid state, passive components with virtually no risk involved.

While the energy saved per inflation cycle as discussed above is modest, it is estimated that 250 million cars, trucks, motorcycles, bicycles, and myriad other vehicles having pneumatic tires require in the order of 1 billion inflation top-offs per year. It is not required that every tire needs deep therapy but only that the driver pull up to and use one of the 125,000 air machines. In point of fact, the less air the tire needs, the more compelling the applicant's proposal. This "stop" circuit coupled with the 11 million kwh vent port savings, can save in the order of 35 million kwh per year nationally if employed on all 125,000 machines.

Since the invention involves only modifications of components already in use, there is no need for an extensive learning curve or the embrace of a new or unfriendly technology. Moreover, the costs of the modifications are very modest and represent in themselves no material price barrier. The return on the modest investment in the two components is exponentially cost effective. The happy consequence of rapid acceptance is, of course, more effective conservation of the nation's energy resources.

SUMMARY

This considerable savings of 35 million kwh in the nations energy supply is enabled by the unique concept of the current reduction feature of the just patented vent port to create an electric analog of tire inflation activity, married to an induction coil having sufficient current-sensing sensitivity to read that analog, so as to more efficiently control compressor operation. While an induction coil is not new technology, the new and novel application of the concept as a sensor of the tire inflation analog created by the vent port certainly is. The manufacturers of electric control modules have had 10 years and other analogs of inflation activity available to solve this problem and have not done so. Because of the very considerable value of such a circuit to machine owners in reducing repairs, the manufacturers certainly had incentive to do so.

Perhaps more important, the application of the induction coil, timers and related switches to a conventional control circuit has an additional and unexpected result, not only of helping to obliterate tens of thousands of air machine compressor failures, but contributing to the higher calling of conserving vast amounts of the nation's valuable energy resources.

LIST OF REFERENCE NUMBERS IN DRAWINGS

Figure 1:
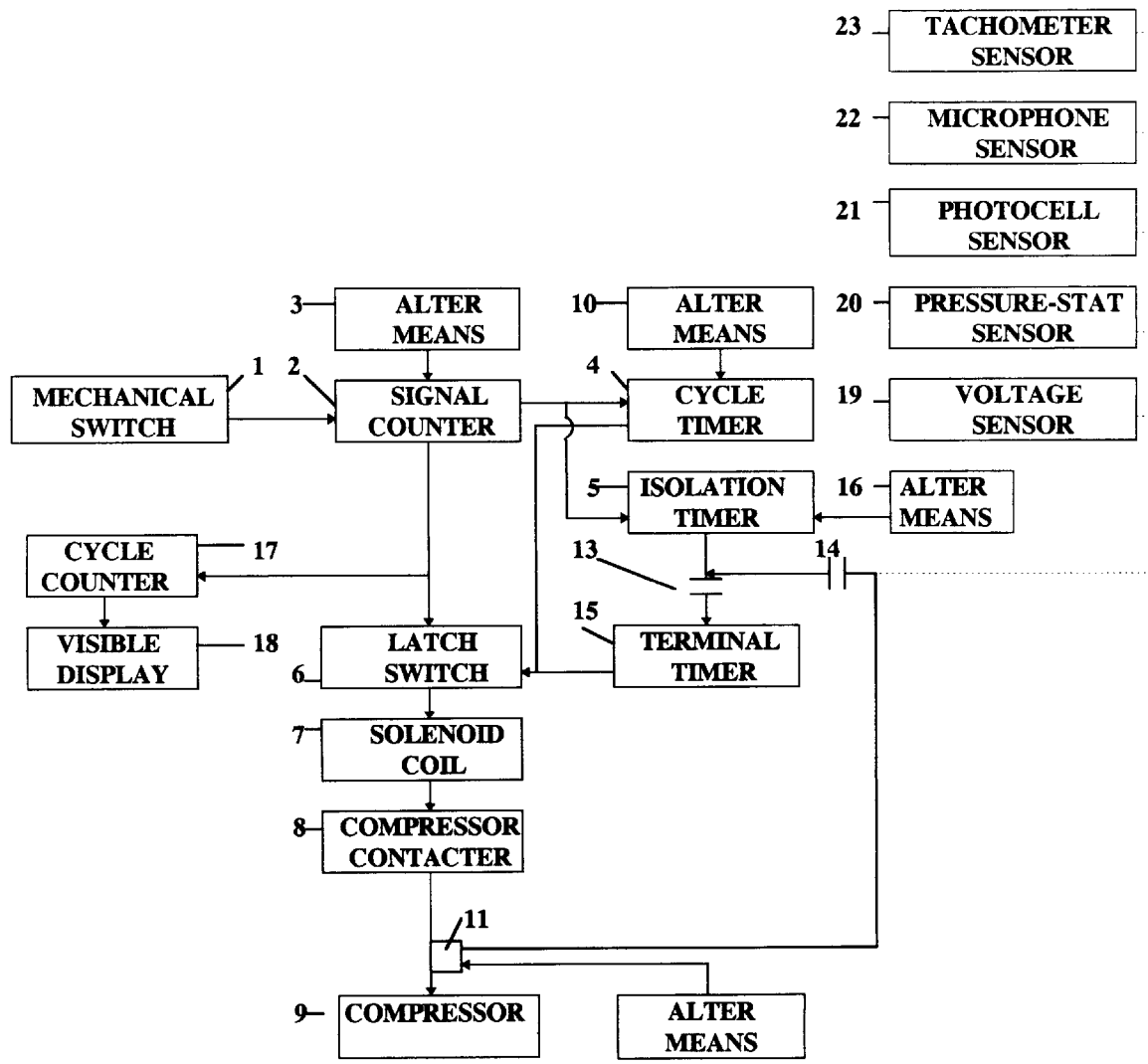
FIG. 1: A schematic block diagram of the conventional circuit functions and showing the added improvement functions.

| LIST OF REFERENCE NUMBERS IN DRAWINGS: | | | |
| --- | --- | --- | --- |
| mechanical switch | 1 | grace variable resistor | 16 |
| signal counter | 2 | cycle counter | 17 |
| start signal alter means | 3 | visible count display | 18 |
| cycle run time timer | 4 | voltage sensor | 19 |
| 60 second isolation timer | 5 | pressure stat sensor | 20 |
| latch switch | 6 | photo cell sensor | 21 |
| contacted holding coil | 7 | microphone sensor | 22 |
| compressor contacted | 8 | tachometer sensor | 23 |
| compressor motor | 9 | assembly threads | 24 |
| cycle variable resistor | 10 | port assembly | 25 |
| release port | 11 | gauge body | 26 |
| induction coil sensor | 12 | vent port | 27 |
| isolation switch | 13 | gauge handle | 28 |
| threshold switch | 14 | piston | 29 |
| termination timer | 15 | compression spring | 30 |

DESCRIPTION OF THE INVENTION

PREVIOUSLY PATENTED PORT:

The function of the patented normally-open pressure release port is to release system pressure to atmosphere any time the gauge is not actually attached to the tire valve stem, thus materially reducing the system pressure for most of the fixed operating cycle, eliminating in the process most compressor component failures in addition to very considerable energy consumption (perhaps as much as 11 million kwh per year industry wide.) When the gauge handle is depressed to admit air to the tire, the vent port is closed and all the air is directed to the tire. Happily this interaction of the vent port with the gauge handle has a unique by-product of considerable consequence, to wit, it provides a very accurate and usable analog of tire inflation activity. Without this low-pressure analog, there is no operating condition to signal that inflation might indeed be over, i.e. the compressor is always operating under full load, either inflating the tire or lifting the safety.

INFLATION ANALOG:

Any time then, with the vent port in place if there is high pressure in the system it means that the gauge is fixed to the tire valve stem inflating the tire, otherwise it would be venting to atmosphere through the gauge port. Conversely, if it can be determined that the pressure has been venting for a certain amount of time, say 20 seconds or so, it can reasonably be assumed that the inflation is complete. The user is hanging up the hose, or more likely, has dropped it on the ground and is driving away. The machine can then be quickly shut down with impunity.

NARROW GAUGE:

While the gauge can successfully vent excessive pressure, it cannot by itself shut off the compressor. Keying on the phenomenon that when the pressure port is venting the compressor is working less hard and consequently drawing less current, affords a unique technique to use the reduced current draw to trigger termination.

TRIGGERING TERMINATION:

The trigger technique is to monitor current draw using an induction coil surrounding one leg of the compressor power supply. The current flow in the power leg induces a current flow in the induction coil. Moreover as the compressor work load and current draw varies, a corresponding, proportional, variation occurs in the induction coil. These induction coil current variations can be used to energize or de-energize a termination timer. The termination timer will, when energized, shut off the compressor—but not before a built-in "grace period".

GRACE PERIOD:

When the current level drops to a certain level it energizes the termination timer which runs for 20 seconds, the grace period, thus delaying compressor shutoff to insure that inflation is actually complete. If no further gauge action occurs, the inflation is deemed finished and the compressor operation is terminated. Should the gauge handle, during the grace period, be depressed, closing the port and causing the current flow to increase, the higher current will cause the termination timer to be de-energized and the compressor operation to continue. It is not until the current level drops to the prescribed level and stays there for 20 seconds that the termination occurs. The upshot of the control sequence is that 20 seconds after inflation is complete, the compressor is shut off, but not before.

TERMINATION ISOLATION:

There is, however, another important point to be addressed, to wit, at the onset of the cycle, it is possible that the user is distracted or otherwise delayed in getting started inflating the tire. It is entirely possible during this early stage to have a 20-second period during which the gage handle is not depressed yet the inflation activity is not remotely complete. After inflation activity has started it is rare that even as little as 5 seconds elapse without the gauge handle being depressed. It seems that it is deeply embedded in the human psyche to press the handle repeatedly just to hear the air spurt out. This primordial human urge is relied on in setting the grace period at 20 seconds, which in the tire inflation scheme of things is actually quite a long time. If after getting started, the gauge handle is not depressed for 20 seconds, the user has dropped dead beside or near the tire, or the activity is complete and the user is driving away, generally the latter. To insure that the user does indeed get started without having the gauge prematurely go dead in his/her hands, there is a third timer added to the conventional circuit that isolates the 20-second termination timer for the first 60 seconds of compressor operation. Most tires as explained earlier are inflated in less than 60 seconds so the 60 second isolation delay is almost certainly adequate.

CONVENTIONAL WISDOM:

The invention, then, comprises an improvement to the conventional electrical control circuit for tankless air systems, said circuit, in response to switch action brought on by some human input, generally the push of a button or the insertion of coins, energizes the air machine compressor and a fixed-time cycle timer which, after its fixed run, unlatches the conventional latch switch and in turn the compressor contactor solenoid to end the compressor run cycle. Additionally most conventional circuits have the capacity to alter the number of switch signals required to energize the compressor and also a variable-resistor means for altering the length of the fixed run time. These components and ancillary enabling components are generally mounted on a circuit board and potted in a module about the size of a deck of cards.

WISDOM PLUS:

The improved control circuit has all these conventional features plus an induction coil, an isolation timer, an isolation switch, a threshold switch, a termination timer, miscellaneous enabling components and also, in the air system inflater gauge, a pressure release port for venting high air pressure air to atmosphere.

The conventional switch action previously mentioned, in addition to the 3.5 minute cycle timer also energizes the newly added isolation timer the purpose of which is to isolate the termination timer from input from the induction coil for the first 60 seconds of compressor operation, at which time the isolation timer closes the normally-open isolation switch.

With the normally-open isolation switched closed, reduced levels of the induced current in the induction coil brought on by gauge port venting activity if at the proper level to pass through, may now activate the termination timer. The termination timer has a variable-resistor means for altering the length of the "grace" period if desired, but the 20-second delay previously discussed is adequate.

NON-ESSENTIAL WISDOM:

While not essential to the cycle termination function, the proposed circuit has as a further improvement, to wit, an integral, fail-safe means for counting compressor run cycles and a visible display means for displaying the accumulative cycle count on the face of the circuit module. This counting and display activity is useful in machine use accounting to determine revenues easily, and secondly to track component cycle-life and replacement schedules. If this non-essential cycle counting activity fails, however, it fails safe and will not impair the function of the circuit proper, which is the more important function.

OPERATION OF THE INVENTION

CONVENTIONAL CIRCUIT:

FIG. 1. Mechanical action switch 1, being coin or push button actuated, converts mechanical action to electrical signals. Signal counter 2 receives said electrical signals and when number of signals matches predetermined count as determined by start signal alter means 3, signal counter 2 energizes cycle timer 4, isolation timer 5, cycle counter 17 and latches latch switch 6. Latch switch 6 energizes contractor solenoid coil 7, closing power contacts 8 conveying line current to energize compressor motor 9. Latch switch 6 and contractor solenoid coil 7 remain energized until latch switch 6 is unlatched by action of cycle timer 4 or termination timer 15.

Cycle timer 4, when energized by signal counter 2, runs for a length of time as predetermined by alter means 10. When said predetermined time is reached, cycle timer unlatches latch switch 6 which in turn de-energizes solenoid coil 7 disconnecting compressor motor 9.

Figure 2:
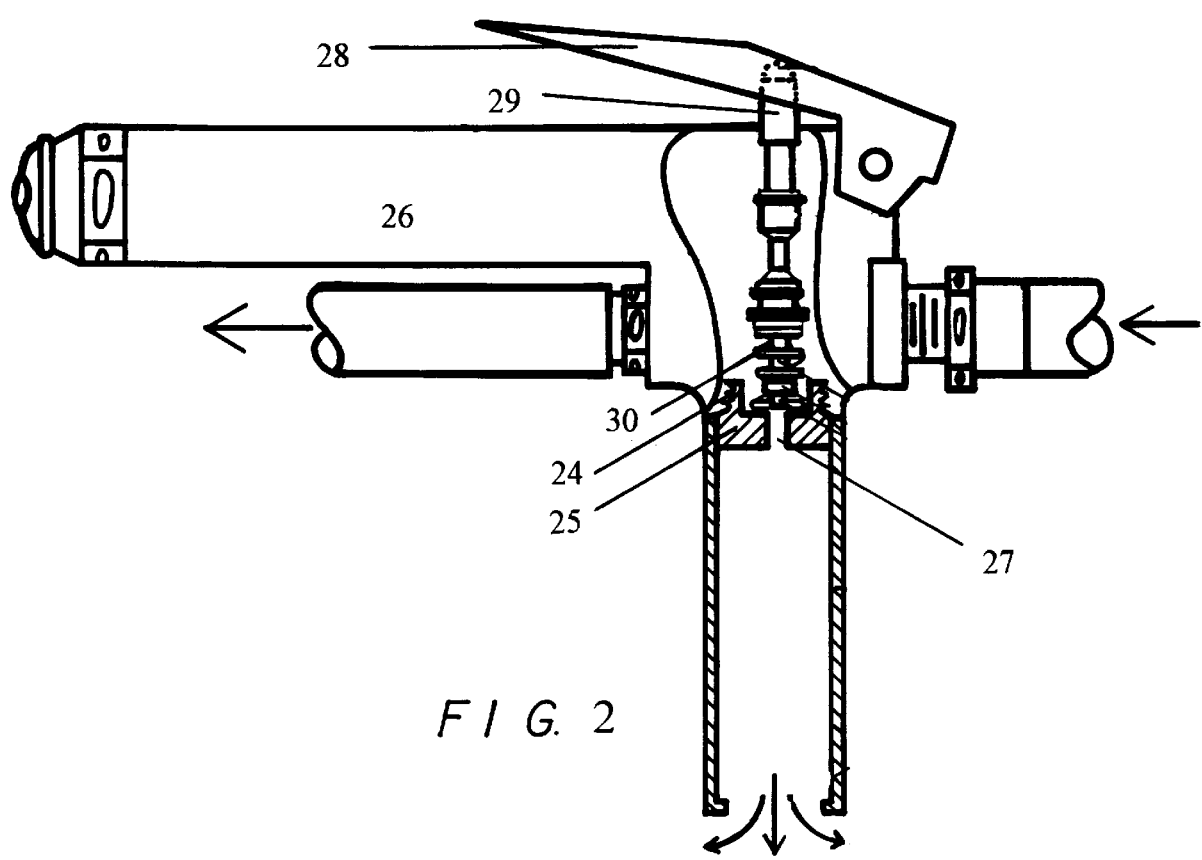
FIG. 2: A cutaway view of the inflater gauge having the patented pressure release port installed.

THRESHOLD LEVEL:

FIG. 2. Threads 24 of inventor's patented gauge pressure port assembly 25, screws into gauge body 26 allowing pressurized air to vent to atmosphere thru port 27 until user depresses handle 28 pressing piston 29 down to close port 27 during inflation. When inflation is interrupted or completed, compression spring 30 raises piston out of port 27 and venting resumes.

The electromotive force of one leg of compressor power source induces a proportional current to flow in induction coil 11 surrounding said leg. When induced current level in the induction coil drops to a threshold level commensurate with a port venting condition, and if the normally-open isolation switch 13 has been closed by the isolation timer 5 after 60 seconds, the threshold switch 14 is closed to energize termination timer 15, starting its 20-second countdown to cycle termination.

COMPRESSION CONTINUES:

If, during the termination timer's countdown period the gauge handle is depressed, closing the release port even momentarily, said induced current instantly increases, opening said threshold switch, causing the termination timer to be de-energized, and compression continues. The next vented, reduced current condition causes the termination time to start again from zero.

TOTAL TERMINATION:

If no handle depression occurs during the 20-second fixed time period, it is assumed that tire inflation is complete and termination timer 15 unlatches latch switch 6, disconnecting the compressor motor. If either cycle timer 4 or termination timer 15 unlatches latch switch 6, the compressor operation is terminated until such time as mechanical switch 1 is activated again.

ALSO:

Cycle counter 17 counts each compressor run cycle and displays the accumulated total on visible display 18.

OTHER EMBODIMENTS OF SENSING MEANS

The embodiment of an improved conventional electric control circuit for air machines as defined above is much the preferred embodiment for many direct and indirect reasons. There are, however, several other analogs of the inflation activity which are quite functionally valid. Some of these variations are briefly discussed below. These and all others of similar ilk are believed to be encompassed by the claims of this application.

Voltage sensor 19: a sensor sensing voltage rather than current changes in response to compressor load, opens or closes the threshold switch 14 energizing the termination timer in identical fashion to the induction coil.

Pressure stat sensor 20: a pressure stat inserted in the pressurized air system senses drop in pressure when port is venting and electrically energizes termination timer.

Photocell sensor 21 senses drop in light level of light source wired in series with compressor in response to compressor loads and energizes the termination timer.

Microphone sensor 22 senses drop in sound level of compressor in response to compressor loads and energizes the termination timer.

Mechanical or strobe tachometer sensor 23 senses change in compressor rpm in response to compressor loads and energizes the termination timer.

Lastly, the sensing/termination interaction can be made "rise or fall". This is to say, with any of the embodiments the triggering of the termination timer can be made to be either on a rise to a certain predetermined threshold value or a fall to a certain value.

RAMIFICATIONS AND SCOPE OF THE INVENTION

The examiner will see that the conventional electric control circuit for air machines can be enhanced to a new level of control wherein tracking the created tire inflation analog is possible with such precision that virtually no extraneous compressor operation is experienced. The material reduction in compressor stress and compelling energy savings are clearly novel and in the public interest.

While my above description of my preferred embodiment and other embodiments contains many specificity's, these should not be construed as limitations on the scope of the invention, but rather as an exemplification of one preferred embodiment thereof. It is certainly valid to have a single microprocessor perform the tasks assigned to the various timers and switches, and a solid-state compressor relay in lieu of the electro-mechanical contactor presently used in conventional circuits. In time, economics permitting, these will be the methods of choice of the inventor. Additionally many other variations of virtually every concept or component defined are possible.

Accordingly, the scope of the invention should be determined not by the embodiments illustrated but by the appended claims and their legal equivalents.

I claim:

1. A method of terminating compressor operation in tankless automobile tire inflater machines after tire inflation is complete rather than necessarily after a fixed run time, having, in combination with an automatic system pressure release device, method of termination comprising steps of:

(a) causing system pressure, during said compressor operation, to be automatically released any time tire inflation is not actually in progress, (b) monitoring compressor current consumption rate during compressor operation, (c) terminating compressor operation if said monitored consumption rate reaches a predetermined level for a predetermined period of time, whereby the system compressor operation will be terminated if tire inflation activity is completed before the end of the conventional fixed run period, thus saving electrical power and compressor wear.

2. A method as recited in claim 1, wherein causing automatic system pressure release when inflation is not in progress comprises:

(a) providing a normally-open vent port (27) in inflater gauge (26) which is closed when gauge is applied to tire valve stem and gauge handle (28) is depressed, directing compressed air to the tire, (b) releasing said compressed air to atmosphere thru said normally-open vent port (27) when gauge handle is not depressed.

3. A method as recited in claim 1, wherein terminating compressor operation after inflation is complete comprises steps of:

(a) isolating compressor operation against premature termination, (b) removing said isolation after predetermined period of compressor operation, (c) monitoring compressor current consumption rate, inflating or venting, (d) initiating a timing activity when said monitored rate reaches a predetermined level, (e) terminating compressor operation if said monitored rate reaches said predetermined level for a predetermined period of time, whereby the compressor current monitor (11), sensing the reduced compressor current level enabled by pumping freely at atmospheric pressure level, switches on termination timer (15).

4. Compressor operation termination means for terminating compressor operation in tankless automobile tire inflater machines after tire inflation is complete rather than necessarily after a fixed run time, comprising, in combination with an automatic system pressure release device:

(a) pressure release means (24–30) for automatically releasing system pressure when tire inflation is not actually in progress, (b) monitoring means (11) for monitoring electric current consumption rates during compressor operation, (c) terminating means (2–16) for terminating compressor operation if said monitored rate reaches a predetermined interval for a predetermined period of time, whereby the system compressor will be terminated promptly after tire inflation activity is completed rather than necessarily after a fixed run period, thus saving electrical power and compressor wear.

5. Compressor operation termination means as recited in claim 4, further comprising pressure release means (24–30) for automatically releasing air pressure freely to atmospheric level when tire inflation is not in actually in progress, wherein normally-open vent port (27) is open any time inflater gauge handle (28) is not depressed, whereby the compressor current monitor (11), sensing the reduced compressor current level enabled by pumping freely at atmospheric pressure level, switches on termination timer (15).

6. Compressor operation termination means as recited in claim 4, wherein said monitoring means (11) operatively connected to termination timer (15), senses compressor current consumption rate, said monitor, depending on rate level, cycles termination timer (15) on or off, each on-cycle restarting timer grace period again from zero.

7. Compressor operation termination means as recited in claim 4, wherein said termination means further comprising a two-position termination timer isolation switch (13), whereby the termination timer (15) may not be energized unless said isolation switch (13) is closed by isolation timer (5) after a predetermined period.

8. Compressor operation termination means as recited in claim 4, wherein said termination means further comprising an isolation timer (5), said isolation timer having a fixed isolation period, said isolation timer repositioning said two-position isolation switch (13) to on at end of isolation period.

9. Compressor operation termination means as recited in claim 4, wherein said termination means further comprising a termination timer (15), said termination timer having a fixed grace time period, said termination timer having alter means for manually altering said grace time period, said termination timer (15) unlatching conventional circuit compressor contactor latch switch (6) at end of said grace time period.

* * * * *